(12) United States Patent
Kaplan (10) Patent No.: US 10,543,939 B2
(45) Date of Patent: Jan. 28, 2020

(54) APPARATUS AND METHODS FOR CREATING ARTIFICIAL NEAR-EARTH ORBITS

(71) Applicant: Launchspace Technologies Corporation, Wilmington, DE (US)

(72) Inventor: Marshall H. Kaplan, Bethesda, MD (US)

(*) Notice: Subject to any disclaimer, the term of this patent is extended or adjusted under 35 U.S.C. 154(b) by 23 days.

(21) Appl. No.: 16/032,845

(22) Filed: Jul. 11, 2018

(65) Prior Publication Data

US 2019/0248516 A1    Aug. 15, 2019

Related U.S. Application Data

(63) Continuation-in-part of application No. 15/912,658, filed on Mar. 6, 2018, now Pat. No. 10,059,470.

(60) Provisional application No. 62/628,345, filed on Feb. 9, 2018.

(51) Int. Cl.
*B64G 1/24* (2006.01)
*G08G 9/02* (2006.01)
*B64G 1/64* (2006.01)
*B64G 1/40* (2006.01)

(52) U.S. Cl.
CPC ............. *B64G 1/242* (2013.01); *B64G 1/405* (2013.01); *B64G 1/646* (2013.01); *G08G 9/02* (2013.01)

(58) Field of Classification Search
CPC . B64G 1/242; B64G 1/52; B64G 1/26; B64G 1/24

See application file for complete search history.

(56) References Cited

U.S. PATENT DOCUMENTS

| 3,004,735 | A | 10/1961 | Kinard |
| 3,277,724 | A | 10/1966 | Lundeberg |
| 3,381,420 | A | 5/1968 | Brink et al. |
| 4,306,692 | A | 12/1981 | Kaplan et al. |
| 4,381,092 | A | 4/1983 | Barker |
| 4,991,799 | A | 2/1991 | Petro |
| 5,259,577 | A | 11/1993 | Achkar et al. |
| 5,277,385 | A | 1/1994 | Flament |
| 5,299,764 | A | 4/1994 | Scott |
| 5,372,340 | A | 12/1994 | Ihara et al. |
| 5,485,485 | A | 1/1996 | Briskman et al. |
| 5,511,748 | A | 4/1996 | Scott |

(Continued)

OTHER PUBLICATIONS

Phipps, C., "Catcher's Mitt" as an Alternative to laser Space Debris Mitigation, AIP Conference Proceedings, Oct. 2010.

(Continued)

*Primary Examiner* — Brian M O'Hara
(74) *Attorney, Agent, or Firm* — Wiley Rein LLP (57) ABSTRACT

An orbiting satellite can be maintained in a virtual orbit, having an orbital period equal to the natural orbit of a satellite at a different altitude, by equipping the satellite with at least one radial thruster. Radial thrusters on the anti-nadir-facing side of the satellite allow for virtual orbits higher than the natural altitude, while radial thrusters on the nadir-facing side of the satellite allow for virtual orbits lower than the natural altitude. This allows a satellite to evade threats, such as orbital debris and/or hostile spacecraft, without losing its relative position within a satellite constellation or experiencing the diminished services often attendant such maneuvers. Similar techniques can also be used for surveillance of orbiting satellites.

13 Claims, 6 Drawing Sheets

(56) References Cited

U.S. PATENT DOCUMENTS

| | | | |
|---|---|---|---|
| 5,813,632 A | 9/1998 | Taylor | |
| 6,042,058 A * | 3/2000 | Anzel | B64G 1/24 244/164 |
| 6,419,191 B1 | 7/2002 | Hoyt et al. | |
| 6,439,508 B1 | 8/2002 | Taylor | |
| 6,484,973 B1 | 11/2002 | Scott | |
| 6,655,637 B1 | 12/2003 | Robinson | |
| 6,843,446 B2 * | 1/2005 | Scott | B64G 1/007 244/10 |
| 6,845,303 B1 | 1/2005 | Byler | |
| 6,945,500 B2 | 9/2005 | Wingo | |
| 6,962,310 B1 | 11/2005 | Bigelow | |
| 7,575,200 B2 | 8/2009 | Behrens et al. | |
| 7,905,453 B2 | 3/2011 | Benedict et al. | |
| 9,399,527 B2 | 7/2016 | Lee et al. | |
| 9,434,485 B1 | 9/2016 | Lehocki | |
| 9,555,905 B2 | 1/2017 | Griffith et al. | |
| 2004/0026571 A1 | 2/2004 | Scott | |
| 2004/0245407 A1 | 12/2004 | D'Ausilio et al. | |
| 2005/0067534 A1 | 3/2005 | Anderman et al. | |
| 2005/0151022 A1 | 7/2005 | D'Ausilio et al. | |
| 2005/0258311 A1 | 11/2005 | Scott | |
| 2006/0038085 A1 | 2/2006 | Duden | |
| 2006/0090636 A1 | 5/2006 | Yang et al. | |
| 2006/0145024 A1 | 7/2006 | Kosmas | |
| 2008/0149776 A1 | 6/2008 | Benedict | |
| 2008/0296436 A1 | 12/2008 | D'Ausilio et al. | |
| 2009/0164055 A1 | 6/2009 | Kosmas | |
| 2011/0121139 A1 | 5/2011 | Poulos | |
| 2011/0198446 A1 | 8/2011 | Knirsch et al. | |
| 2012/0068018 A1 | 3/2012 | Wright | |
| 2012/0175467 A1 | 7/2012 | Dye et al. | |
| 2012/0286097 A1 | 11/2012 | Hanada et al. | |
| 2013/0062472 A1 | 3/2013 | Stokes | |
| 2013/0175401 A1 | 7/2013 | Starke et al. | |
| 2014/0367523 A1 | 12/2014 | Kitazawa et al. | |
| 2015/0102174 A1 | 4/2015 | Chu | |
| 2015/0259081 A1 | 9/2015 | Albert et al. | |
| 2016/0023783 A1 | 1/2016 | Griffith, Sr. et al. | |
| 2016/0130020 A1 | 5/2016 | Chambert | |
| 2016/0149599 A1 | 5/2016 | Lindsay et al. | |
| 2016/0244190 A1 | 8/2016 | Okada et al. | |
| 2017/0015444 A1 | 1/2017 | Okada | |
| 2017/0029138 A1 | 2/2017 | Bultel | |
| 2017/0137151 A1 * | 5/2017 | Lui | B64G 1/244 |
| 2017/0247125 A1 | 8/2017 | Stratemeier et al. | |
| 2017/0313447 A1 * | 11/2017 | Reed | B64G 1/242 |

OTHER PUBLICATIONS

Woignier, T. et al., Aerogels Materials as Space Debris Collectors, Hindawi Publishing Corporation, 2013.

John E. Prussing et al., Constant Radial Thrust Acceleration Redux—Engineering Notes, Journal of Guidance, Control, and Dynamics, vol. 21, No. 3, May-Jun. 1998.

Frederick W. Boltz, Orbital Motion Under Continuous Radial Thrust—Engineering Notes, American Institute of Aeronautics and Astronautics, Inc., vol. 14, No. 3, May-Jun. 1991.

H.S. Tsien, Take-Off from Satellite Orbit, Journal of the American Rocket Society, Jul.-Aug. 1953, pp. 233-236.

Battin, R.H., Astronautical Guidance, McGraw-Hill, New York, 1964.

Battin, R.H., An Introduction to the Mathematics and Methods of Astrodynamics, AIAA, New York, 1987.

* cited by examiner

APPARATUS AND METHODS FOR CREATING ARTIFICIAL NEAR-EARTH ORBITS

CROSS-REFERENCE TO RELATED APPLICATIONS

This application is a continuation-in-part of U.S. application Ser. No. 15/912,658, filed 6 Mar. 2018, which claims the benefit of U.S. provisional application No. 62/628,345, filed 9 Feb. 2018. The foregoing applications are hereby incorporated by reference as though fully set forth herein.

BACKGROUND

The instant disclosure relates generally to satellites. In particular, the instant disclosure relates to apparatus and methods for maintaining a satellite's position relative to other satellites in a satellite constellation.

A satellite constellation includes two or more satellites, each having a designated orbit. In order to maintain the services provided by the constellation, it may be desirable for satellites within the constellation to maintain prescribed positions relative to each other. These relative positions need not be fixed, but instead may vary with time according, for example, to a designated algorithm. Yet, because the relative positions of the satellites within the constellation are prescribed, maneuvering a satellite within the constellation—for example, to avoid collision with orbital debris—can result in a degradation in the constellation's performance.

Thus, the altitude, latitude, and longitude of satellites within a constellation are predictable as functions of time. As a result, satellites within a constellation are more vulnerable to debris collisions and/or hostile action (e.g., attack by hostile spacecraft or ground-based threats, such as lasers and anti-satellite missiles). Put another way, because satellites within a constellation cannot maneuver extensively without risking diminished performance, they cannot execute large longitude or latitude maneuvers or altitude changes to evade threats, whether those threats are passive (e.g., orbital debris) or deliberate (e.g., hostile action).

BRIEF SUMMARY

Disclosed herein is a method of controlling a satellite that includes at least one radial thruster positioned on one or more of a nadir-facing side of the satellite and an anti-nadir-facing side of the satellite. The method includes: orbiting the satellite in a natural low Earth orbit at a first altitude; and commanding the at least one radial thruster to generate thrust sufficient to alter an altitude of the satellite and maintain the satellite in a virtual low Earth orbit at a second altitude different from the first altitude and having an orbital period equal to an orbital period of the satellite in the natural low Earth orbit.

The at least one radial thruster can be positioned on the anti-nadir-facing side of the satellite, allowing the second altitude of the virtual orbit to be greater than the first altitude of the natural orbit. Alternatively, the at least one radial thruster can be positioned on the nadir-facing side of the satellite, allowing the second altitude of the virtual orbit to be less than the first altitude of the natural orbit.

In embodiments of the disclosure, the method further includes detecting a threat to the satellite, such as orbital debris, a hostile spacecraft, or a ground-based (e.g., laser or anti-satellite missile) attack. The satellite can evade the threat by commanding the at least one radial thruster to generate sufficient thrust to move the satellite to the virtual low Earth orbit. Once the threat has passed and/or been evaded, the satellite can be returned to the natural orbit, such as by commanding the at least one radial thruster, or another thruster (e.g., a maneuvering thruster) to generate sufficient thrust to return the satellite to the natural orbit.

The at least one radial thruster can include at least one electric propulsion device, such as at least one ion thruster.

In additional aspects of the disclosure, the method further includes identifying a target satellite to surveil. The target satellite has a target orbital period. The satellite can surveil the target satellite by commanding the at least one radial thruster to generate sufficient thrust to position the satellite in the virtual low Earth orbit, such that the satellite can surveil the target satellite from a fixed position relative to the target satellite. The fixed position relative to the target satellite can be radially behind the target satellite or radially in front of the target satellite.

In embodiments, the method also includes docking a maneuver assistance vehicle to the satellite, wherein the at least one radial thruster is attached to the maneuver assistance vehicle.

The foregoing and other aspects, features, details, utilities, and advantages of the present invention will be apparent from reading the following description and claims, and from reviewing the accompanying drawings.

DETAILED DESCRIPTION

The instant disclosure provides apparatus and methods for the creation of virtual orbits. As used herein, a "virtual orbit" is an orbit that has the characteristics of a natural orbit about Earth, including the orbital period of the natural orbit, except the virtual orbit is at a different altitude than the natural orbit. Put another way, for a given altitude above Earth, a "virtual orbit" has a different (e.g., longer or shorter) orbital period than would a natural orbit.

For purposes of illustration, aspects of the disclosure will be described herein with reference to the creation of a virtual low Earth orbit ("LEO"). Those of ordinary skill in the art will appreciate, however, that the instant teachings can be applied to other orbits about Earth, as well as about other celestial bodies.

Figure 1:
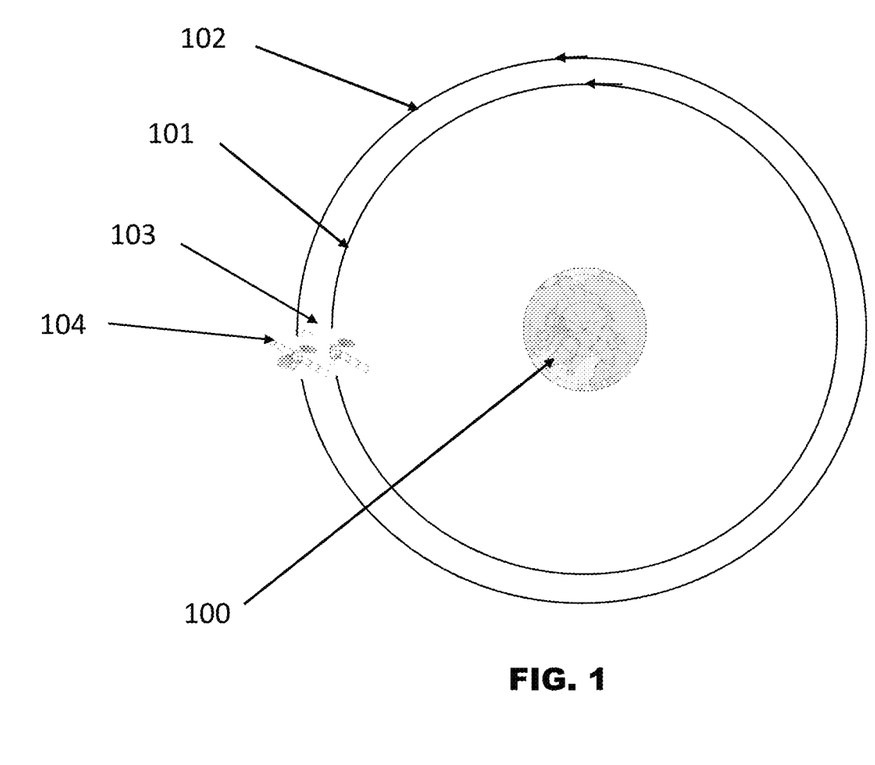
FIG. 1 illustrates two orbits around Earth: a natural orbit and a virtual orbit.

FIG. 1 depicts the Earth 100 and two LEOs 101 and 102 at two different altitudes. A satellite 103 is in LEO 101 and a satellite 104 is in LEO 102.

LEOs 101, 102 are near-Earth orbits in a plane inclined to the Earth's equatorial plane. The inclination of LEOs 101, 102 can be as low as zero (e.g., equatorial orbit) or as high as 90 degrees (e.g., polar orbit), or more. Further, although LEOs 101, 102 are depicted as circular in FIG. 1, they could be elliptical orbits without departing from the scope of the instant teachings.

For purposes of explanation, LEO 101 will be treated as a natural LEO and LEO 102 will be treated as a virtual LEO. Those of ordinary skill in the art will appreciate that, because of its higher altitude, LEO 102 would typically have a longer orbital period than LEO 101. The use of radial thrusters on satellite 104, however, allows satellite 104 traveling in virtual LEO 102 to have an orbital period equal to that of satellite 103 traveling in natural LEO 101. More specifically, and as described in greater detail below, the use of continuous radial thrust to push satellite 104 towards Earth 100 decreases the orbital period of satellite 104 in virtual LEO 102 until it matches that of satellite 103 in natural LEO 101. As used herein, the term "radial thruster" refers to a propulsive device aligned with either the nadir or anti-nadir direction; correspondingly, the term "radial thrust" refers to thrust in either the nadir or anti-nadir direction.

Figure 2:
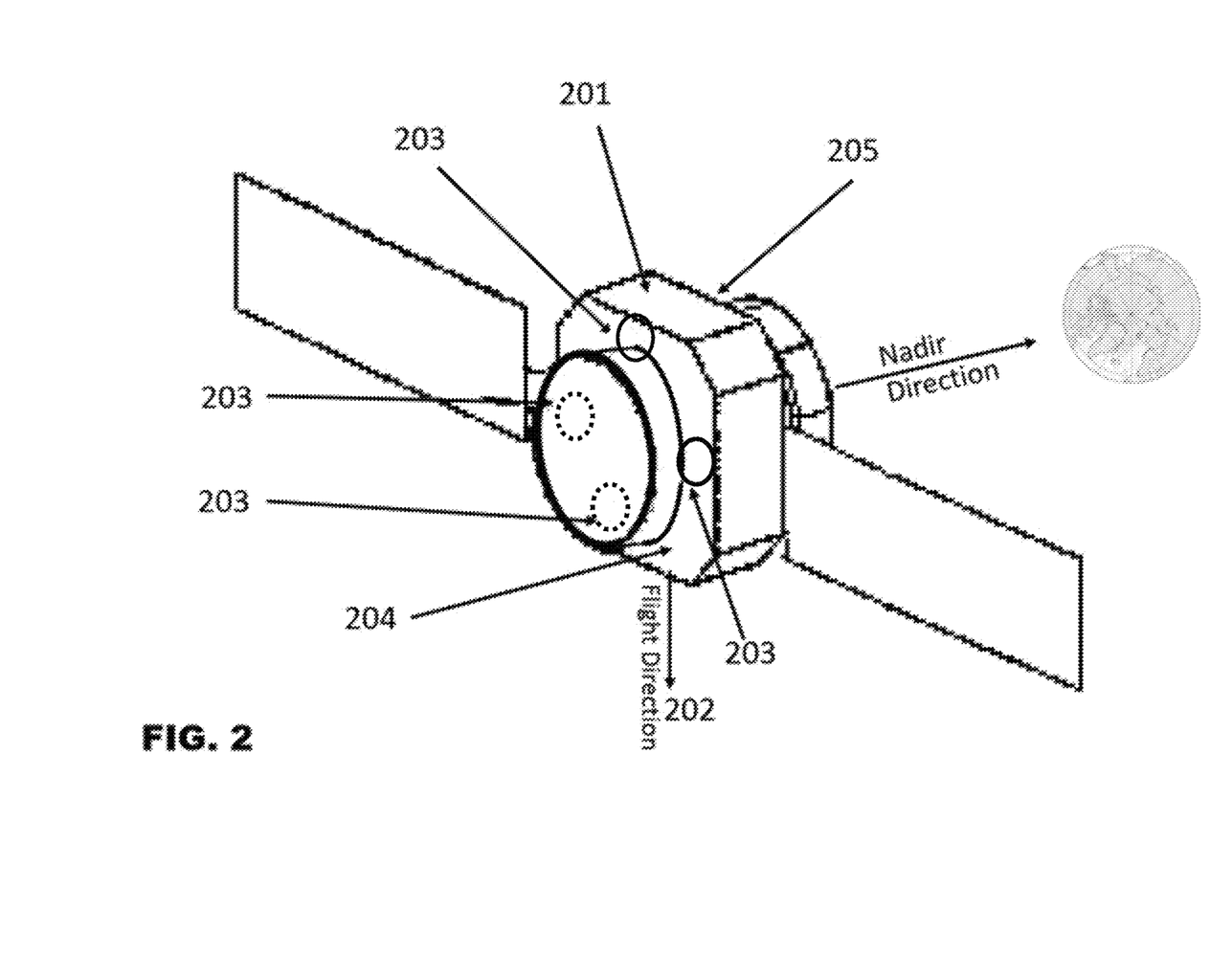
FIG. 2 depicts a satellite equipped with radial thrusters according to aspects of the instant disclosure.

FIG. 2 illustrates an Earth-orbiting satellite 201 with its main antennas oriented towards Earth (e.g., in the nadir direction). The flight direction of satellite 201 is along arrow 202. Satellite 201 can include maneuvering thrusters for latitude and longitude control; insofar as such maneuvering thrusters are generally understood in the art, they need not be further described herein. Satellite 201 also includes one or more radial thrusters 203 on the anti-Earth-facing side 204 of satellite 201 and/or the Earth-facing side 205 of satellite 201 (radial thrusters 203 on the Earth-facing side 205 of satellite 201 are shown in phantom).

With reference to natural LEO 101 and virtual LEO 102 shown in FIG. 1, radial thrusters 203 placed on the anti-Earth-facing side 204 of satellite 201 can generate thrust sufficient to allow satellite 201 to maintain a virtual LEO 102 at a higher altitude than natural LEO 101 while still having the same orbital period as it would naturally have in natural LEO 101. Conversely, radial thrusters 203 placed on the Earth-facing side 205 of satellite 201 can generate thrust sufficient to allow satellite 201 to maintain a virtual LEO 102 at a lower altitude than natural LEO 101 while still having the same orbital period as it would naturally have in natural LEO 101.

In aspects of the disclosure, radial thrusters 203 allow the altitude of satellite 201 to be altered without altering its latitude and/or longitude. Thus, satellite 201 can maintain its mission functions, as though it remained in its assigned natural LEO 101, despite moving to or otherwise being positioned in a virtual LEO at a different altitude.

Desirably, radial thrusters 203 are electric propulsion devices, such as ion thrusters, that can fire for long periods of time at low thrust levels. Alternatively, radial thrusters 203 may be chemical thrusters that can produce high levels of thrust for short periods of time.

It is contemplated that radial thrusters 203 could be incorporated into satellite 201 during manufacture thereof. Alternatively, radial thrusters 203 could be incorporated into a secondary spacecraft that attaches to satellite 201. As an example, radial thrusters 203 could be incorporated into a life extension spacecraft that is attached to an orbiting satellite that is nearing the end of its life and/or into a maneuver assistance vehicle that is attached to an orbiting satellite that lacks radial thrusters.

Figure 3:
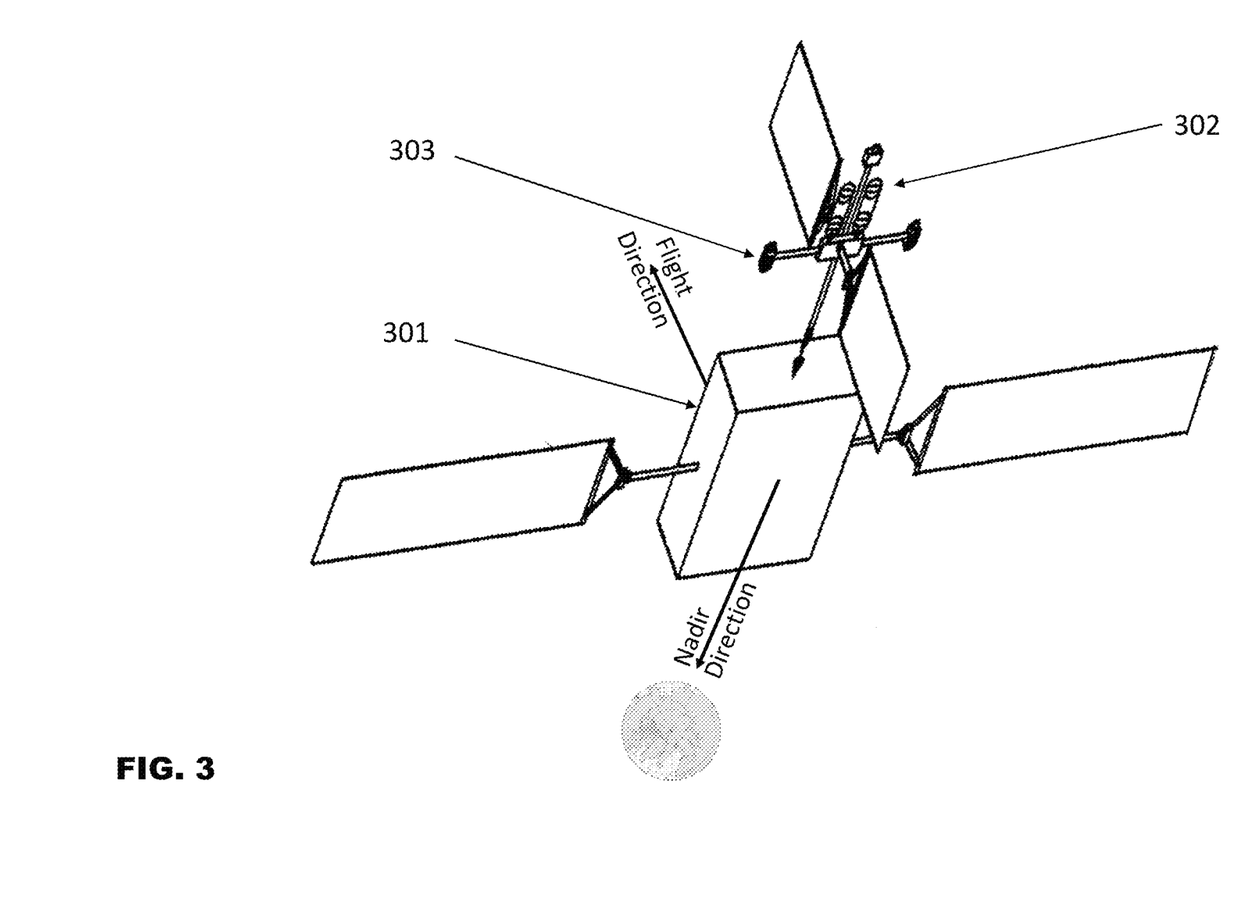
FIG. 3 depicts a maneuver assistance vehicle docked to a satellite.

FIG. 3 depicts an exemplary maneuver assistance vehicle 302 and a satellite 301 lacking radial thrusters. Once maneuver assistance vehicle 302 is docked with satellite 301 (docking will be familiar to those of ordinary skill in the art and need not be described in detail herein), radial thrusters 303 can be deployed.

One example of how to transition a satellite between natural LEO 101 and virtual LEO 102 will now be described. Assume a satellite traveling in natural LEO 101 (e.g., at 600 km altitude) in an easterly direction. One or more west-facing thrusts (e.g., from maneuver thrusters on the satellite) will speed the satellite up, thus resulting in an increase in altitude and natural orbital period. As the satellite increases in altitude to virtual LEO 102, radial thrusters on the anti-Earth facing surface of the satellite will activate, producing thrust sufficient to maintain an orbital period in virtual LEO 102 equal to the natural orbital period in natural LEO 101. To transition the satellite back to natural LEO 101, one or more east-facing thrusts (e.g., from one or more maneuver thrusters on the satellite) can be used to slow the satellite down, allowing it to descend back to natural LEO 101 (e.g., at 600 km altitude).

Figure 4:
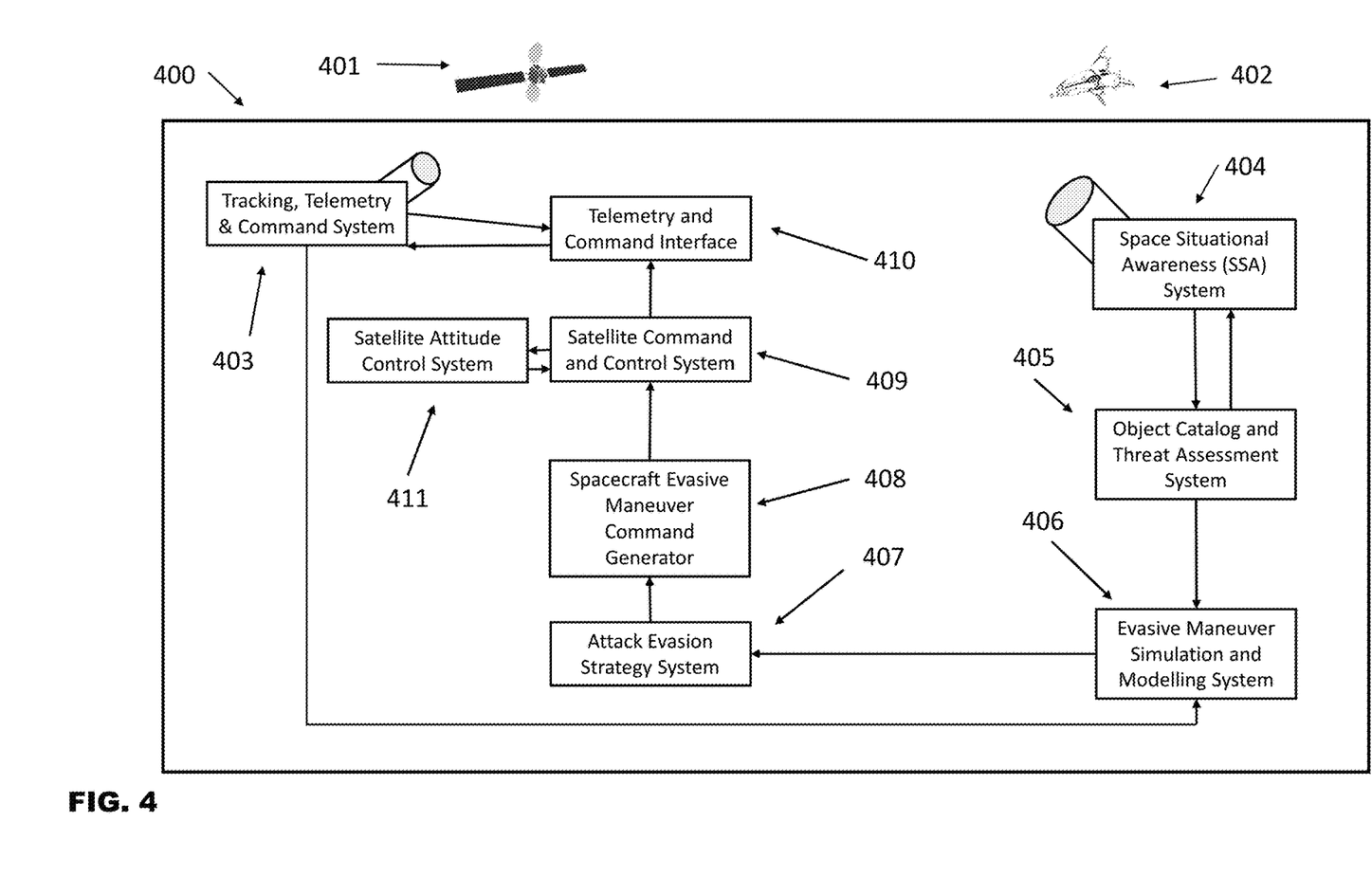
FIG. 4 is a block diagram of an exemplary avoidance control maneuver network according to the teachings herein.

As discussed above, the teachings herein can be applied to good advantage to evade threats to an orbiting satellite, such as debris and hostile action. FIG. 4 illustrates, in block diagram form, an avoidance control maneuver network 400 for planning and executing radial evasive maneuvers that can be executed by a satellite 401 (e.g., using radial thrusters integrated into satellite 401 or a secondary vehicle, such as a maneuver assistance vehicle, docked to satellite 401). A tracking, telemetry, and command system 403 tracks satellite 401 as it orbits Earth 100 (e.g., in natural LEO 101 of FIG. 1).

A threat 402 to satellite 401, such as orbital debris, a hostile spacecraft, a ground-based laser, an anti-satellite missile, or the like is detected by the space situational awareness system 404, an object catalog 405, and/or another suitable ground- or space-based system. Upon confirmation that threat 402 is approaching satellite 401 or otherwise endangering satellite 401, the evasive maneuver simulation and modeling system 406 can issue a threat alert and generate evasive maneuver options. The options can be sent to the evasion strategy system 407, which can in turn select the most desirable or advantageous evasive maneuver model (e.g., to increase or decrease the altitude of satellite 401 relative to natural LEO 101) and thereafter send it to the spacecraft maneuver command generator 408. In the event of a hostile threat, maneuver options can include random or timed complex altitude change profiles to elude an aggressor's attack strategies.

Spacecraft maneuver command generator 408 converts the maneuver model into one or more commands for satellite 401 and forwards those commands to satellite command and control system 409 for integration with other commands (e.g., satellite attitude commands). Commands can then be passed to the telemetry and command interface 410 and, ultimately, sent to satellite 401 via tracking, telemetry, and command system 403. Upon receipt at satellite 401 (including, in embodiments of the disclosure, a secondary spacecraft attached thereto), the commands are executed. A similar process can be followed to return satellite 401 to natural LEO 101 once the threat 402 has abated.

Figure 5:
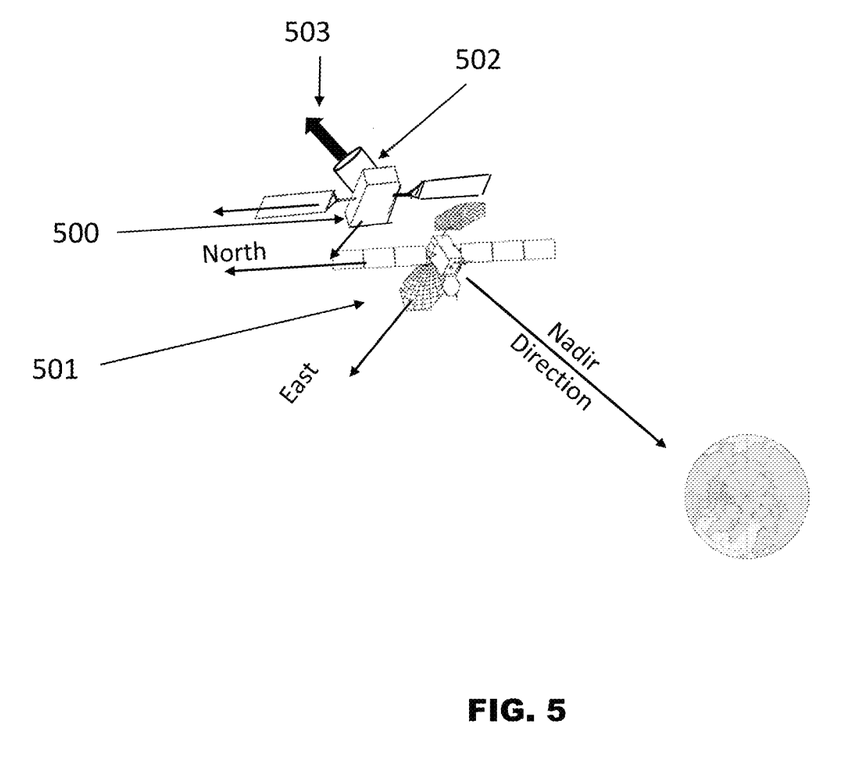
FIG. 5 depicts a surveillance satellite in a virtual orbit surveilling a target satellite in a lower-altitude natural orbit.

As shown in FIG. 5, the teachings herein can also be applied to allow a surveillance satellite 500 in a virtual LEO to surveil a target satellite 501 in a natural LEO. In particular, radial thrusters 502 on surveillance satellite 500 produce an exhaust 503 in the anti-nadir direction that allows surveillance satellite 500 to "hide" behind (that is, at a higher altitude than) and in a fixed relationship to target satellite 501 as target satellite 501 orbits the Earth. Because surveillance satellite 500 is behind target satellite 501 (in a "stakeout" position), it will be difficult to detect the ongoing surveillance.

Figure 6:
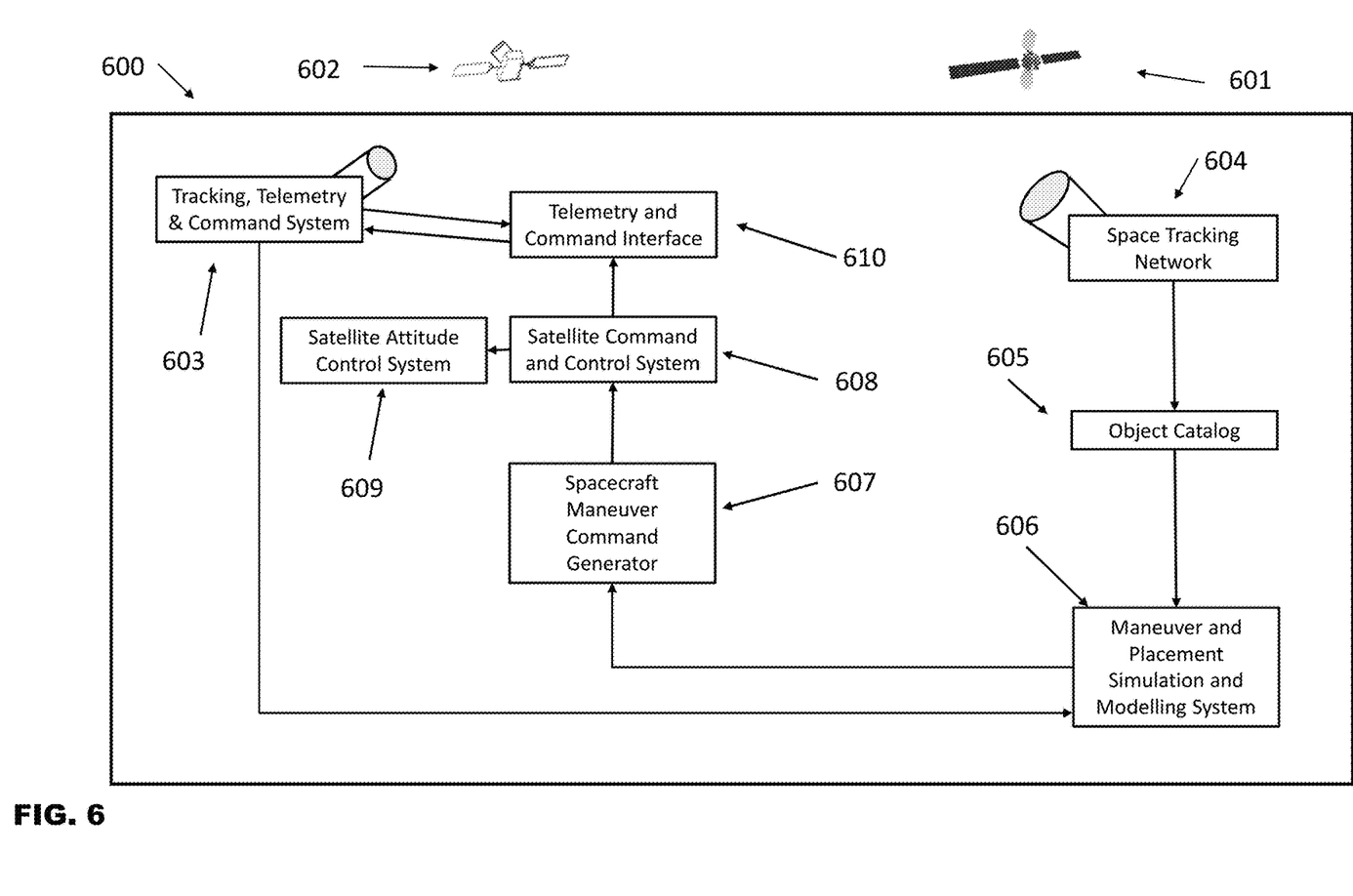
FIG. 6 is a block diagram of an exemplary surveillance maneuver network according to the teachings herein.

FIG. 6 illustrates, in block diagram form, a surveillance maneuver network 600 for achieving and maintaining a surveillance satellite 602 in a stakeout position relative to a target satellite 601 in a natural LEO. Space tracking network 604 detects the position of target satellite 601 and can verify its identity using an object catalog 605. The maneuver and placement simulation and modeling system 606 can then generate the maneuvers to place surveillance satellite 602 in the stakeout position. In turn, commands for the actual maneuver sequence can be generated by spacecraft maneuver command generator 607. The sequence can then be forwarded to a satellite command and control system 608, which can integrate the maneuver commands with additional commands (e.g., from satellite attitude control system 609). The integrated command set can then be passed to a telemetry and command interface 610, which transmits the commands to surveillance satellite 602 through a tracking, telemetry, and command system 603 for execution.

Although several embodiments have been described above with a certain degree of particularity, those skilled in the art could make numerous alterations to the disclosed embodiments without departing from the spirit or scope of this invention.

All directional references (e.g., upper, lower, upward, downward, left, right, leftward, rightward, top, bottom, above, below, vertical, horizontal, clockwise, and counterclockwise) are only used for identification purposes to aid the reader's understanding of the present invention, and do not create limitations, particularly as to the position, orientation, or use of the invention. Joinder references (e.g., attached, coupled, connected, and the like) are to be construed broadly and may include intermediate members between a connection of elements and relative movement between elements. As such, joinder references do not necessarily infer that two elements are directly connected and in fixed relation to each other.

It is intended that all matter contained in the above description or shown in the accompanying drawings shall be interpreted as illustrative only and not limiting. Changes in detail or structure may be made without departing from the spirit of the invention as defined in the appended claims.

What is claimed is:

1. A method of controlling a satellite, the satellite comprising at least one radial thruster, the at least one radial thruster being positioned on one or more of a nadir-facing side of the satellite and an anti-nadir-facing side of the satellite, the method comprising:
   orbiting the satellite in a natural low Earth orbit at a first altitude;
   commanding the at least one radial thruster to generate thrust sufficient to alter an altitude of the satellite and maintain the satellite in a virtual low Earth orbit at a second altitude and having an orbital period equal to an orbital period of the satellite in the natural low Earth orbit.

2. The method according to claim 1, wherein the at least one radial thruster is positioned on the anti-nadir-facing side of the satellite, and wherein the second altitude is greater than the first altitude.

3. The method according to claim 1, wherein the at least one radial thruster is positioned on the nadir-facing side of the satellite, and wherein the second altitude is less than the first altitude.

4. The method according to claim 1, further comprising:
   detecting a threat to the satellite; and
   wherein commanding the at least one radial thruster to generate thrust sufficient to alter an altitude of the satellite and maintain the satellite in a virtual low Earth orbit at a second altitude and having an orbital period equal to an orbital period of the satellite in the natural low Earth orbit comprises evading the threat to the satellite by commanding the at least one radial thruster to generate sufficient thrust to move the satellite to the virtual low Earth orbit.

5. The method according to claim 4, further comprising commanding the at least one radial thruster to generate sufficient thrust to return the satellite to the natural low Earth orbit after evading the threat to the satellite.

6. The method according to claim 4, wherein the threat to the satellite comprises orbital debris.

7. The method according to claim 4, wherein the threat to the satellite comprises a hostile spacecraft.

8. The method according to claim 4, wherein the threat to the satellite comprises a ground-based attack upon the satellite.

9. The method according to claim 1, wherein the at least one radial thruster comprises at least one electric propulsion device.

10. The method according to claim 9, wherein the at least one electric propulsion device comprises at least one ion thruster.

11. The method according to claim 1, further comprising:
    identifying a target satellite to surveil, wherein the target satellite has a target orbital period; and
    wherein commanding the at least one radial thruster to generate thrust sufficient to alter an altitude of the satellite and maintain the satellite in a virtual low Earth orbit at a second altitude and having an orbital period equal to an orbital period of the satellite in the natural low Earth orbit comprises commanding the at least one radial thruster to generate sufficient thrust to position the satellite in the virtual low Earth orbit, such that the satellite can surveil the target satellite from a fixed position relative to the target satellite.

12. The method according to claim 11, wherein the fixed position relative to the target satellite is either radially behind the target satellite or radially in front of the target satellite.

13. The method according to claim 1, further comprising docking a maneuver assistance vehicle to the satellite, wherein the at least one radial thruster is attached to the maneuver assistance vehicle.

\* \* \* \* \*